United States Patent [19]

Murakami et al.

[11] Patent Number: 5,224,632
[45] Date of Patent: Jul. 6, 1993

[54] MEASURING CAP

[75] Inventors: Hiroaki Murakami, Toyonaka; Manabu Waseda, Kawasaki; Hiroaki Hayashi, Kounosu, all of Japan

[21] Appl. No.: 817,563

[22] Filed: Jan. 7, 1992

[30] Foreign Application Priority Data

Jul. 7, 1989 [JP] Japan ................ 89-79635

[51] Int. Cl.⁵ ............................................ B65D 37/00
[52] U.S. Cl. .................................... 222/205; 222/207; 222/546
[58] Field of Search ............... 222/205, 207, 211, 212, 222/546

[56] References Cited

U.S. PATENT DOCUMENTS

| 4,077,547 | 3/1978 | Donoghue | 222/207 |
| 4,106,673 | 8/1978 | Donoghue | 222/211 X |
| 4,377,247 | 3/1983 | Hazard et al. | 222/546 X |
| 4,474,312 | 10/1984 | Donoghue | 222/207 X |
| 4,607,762 | 8/1986 | Zulauf et al. | 222/207 X |
| 4,971,226 | 11/1990 | Donoghue | 222/205 X |

FOREIGN PATENT DOCUMENTS

| 2752669 | 5/1979 | Fed. Rep. of Germany | 222/205 |
| 3819098 | 1/1989 | Fed. Rep. of Germany | 222/211 |
| 2637366 | 4/1990 | France | 222/205 |
| 47-4790 | 2/1972 | Japan. | |
| 63-35973 | 9/1985 | Japan. | |
| 63-44630 | 6/1986 | Japan. | |
| 61-99568 | 6/1986 | Japan. | |

*Primary Examiner*—Andres Kashnikow
*Assistant Examiner*—Kenneth Bomberg
*Attorney, Agent, or Firm*—E. Kelly Linman; William Scott Andes

[57] ABSTRACT

A measuring cap which is attached onto a squeezable bottle, and can extract a desirable amount of liquid inside the bottle into the measuring chamber of the cap by squeezing the body of the bottle. Measuring cap (1) consists of cap main body (3), inner plug (4), and supply pipe (5), cap main body is integrally constituted by bottle neck engaging wall (6), is a measuring chamber (9) constituted by circumferential wall of measuring chamber (7) and top wall (15) which forms a pouring mouth at an upper portion, and an upper cap (8) which has a bung that can close the pouring mouth. The inner plug has a discharging pipe (21) and an engaging circumferential wall (22) which engages to the circumferential walls of the measuring chamber, and the discharging pipe (21) and engaging circumferential wall is constituted by being connected with the bottom wall of measuring chamber (23). The measuring cap is assembled by engaging the inner plug to the cap main body by inserting from below, and engaging the supply pipe (5) to the lower end of the discharging pipe (21).

5 Claims, 2 Drawing Sheets

MEASURING CAP

This is a continuation of International Application PCT/JP90/00874 which was filed on Jul. 7, 1990 which claims priority under the Paris Convention to Japanese Patent Application 89-79635 which was filed on Jul. 7, 1989.

INDUSTRIAL FIELD OF THE INVENTION

The present invention concerns a measuring cap having a measuring chamber, and in further detail, a measuring cap of a squeezable bottle capable of extracting the inner liquid into the chamber by squeezing the body of the bottle.

BACKGROUND ART

Heretofore, as a measuring cap for measuring and extracting a liquid contained in a squeezable bottle, there have been known the following three types:

(a) having an inner plug containing a measuring cup, the inner plug is attached to the bottle neck and the opening of the plug is closed by a screw cap (for example, Japanese Patent Publication Sho 63-44630 and Japanese Utility Model Publication Sho 63-35973), (b) a step is formed to a bottle neck and an inner plug constituting the bottom of a measuring chamber is fit to the step to constitute a measuring cup by the bottle neck per se and a cap is screw coupled to the opening of the bottle (for example, Japanese Utility Model Laid-Open Sho 61-99568)

(c) a measuring chamber is constituted by fitting an inner plug to a cap main body, in which an over flow port of the inner plug connected with a supply pipe is opened or closed by a button and the pouring mouth of the measuring chamber is left open (for example, Japanese Patent Publication Sho 47-4790).

In both conventional types (a) and (b) described above, since the upper portion of the measuring chamber is entirely opened to form a pouring mouth, the pouring mouth is inevitably enlarged making discharge difficult and liquid draining poor tending to cause dripping. Further, in the said type (a), since the outer circumference of the measuring chamber is in three or two layers because of the overlap of the circumferential wall of the bottle neck, side wall of the measuring cap and the side wall of the cap and since it is situated to the inner side of the wall formed with threads, it is difficult to externally observe the state of the inner liquid discharged to the measuring chamber even if they are made of transparent material. Thus, if it is intended to extract a smaller volume than the constant volume, it is only possible to control the squeezing of the bottle by a hunch and a liquid of a volume less than the constant volume can not easily be extracted by measuring. Further, since the wall portions are overlapped, the material cost is increased by so much.

Further, the said type (b) has a drawback that the shape of the bottle neck is complicated and the capping step after charging the inner liquid needs two steps, i.e., a step of exactly fitting an inner plug having a disc constituting the bottom wall of the measuring chamber to a deep position of the bottle neck in a tightly sealed state and a step of screw-coupling the cap making it complicated thus reducing the efficiency extremely in the capping step. Further, if the measuring chamber is left open as in type (c), liquid remaining after use in the measuring chamber may coagulate or it may spill when the bottle falls over.

Further, since the bottom wall of the measuring chamber is flat in the conventional type, even if the inside of the measuring chamber can be observed visually from the outside, it is difficult to discharge a small volume of liquid under observation. Furthermore, in a case where the cap is adapted to be attached by screwing, it has a drawback that the cap has to be removed upon every use and also making it impossible to conduct one-touch operation.

DISCLOSURE OF THE INVENTION

The object of the present invention is to overcome the foregoing drawbacks in the conventional measuring cap, and in further detail, to provide a measuring cap of which the inside of the measuring chamber can be observed from outside, capable of measuring and extracting an optional volume of liquid by one touch, and enables easy discharge, reducing remaining liquid and dripping.

Another object of the present invention is to provide a measuring cap which is easily capped to the bottle, and capable of reducing manufacturing cost.

Further object of the present invention is to provide a measuring cap of which the pouring mouth can be opened and closed by one touch.

These objects can be attained by the measuring cap comprising a cap main body integrally constituted with a bottle neck engaging wall for engaging a bottle neck, a circumferential wall of the measuring chamber constituting the outer circumferential wall of the measuring chamber, and a top wall of the measuring chamber formed with a pouring mouth, an upper cap for closing the pouring mouth of the cap main body, an inner plug integrally constituted with a discharging pipe having a supply pipe engaging portion formed at a lower portion thereof for engaging a supply pipe and a liquid discharging aperture opened at or near the top portion, an engaging outer wall for engaging the circumferential wall of the measuring chamber and a bottom wall of the measuring chamber and a supply pipe engaged to the supply pipe engaging portion of the inner plug, in which the engaging outer wall of the inner plug is engaged to the lower end of the circumferential wall of the measuring chamber to define a tightly closed measuring chamber with the circumferential wall of the measuring chamber of the cap main body and the bottom wall of the measuring chamber of the inner plug that can be seen through from the outside.

Concerning this measuring cap, the number of parts is reduced and assembling and handling upon use of the cap main body can be facilitated by integrally molding an upper cap for closing the pouring mouth of the cap main body with the cap main body while connecting by means of a spring hinge near the top of the circumferential wall of the measuring chamber of the cap main body. Further, more exact extraction of a small volume is enabled by slanting the bottom wall of the measuring chamber outwardly and downwardly between the discharging pipe and the engaging outer wall.

Further, extraction is facilitated by forming the pouring mouth at a position displaced from the center. Furthermore, the liquid is prevented from splashing to the outside even when the squeezing is applied while leaving the upper cap left open by forming the liquid discharging aperture of the discharging pipe slit-width near the closed top of the discharging pipe and forming a direction aligning means for engaging the inner plug to the cap main body such that the liquid discharging aperture of the inner plug is displaced from the direction of the pouring mouth of the cap.

The above constituted measuring cap enables constant volume extraction by squeezing the bottle, thus the inner liquid is forced through the supply pipe into the measuring chamber, and when the liquid in the measuring chamber reaches a height at the liquid exit of the discharging pipe, since a volume of the liquid in excess of this returns into the bottle when the bottle restores its original shape, the liquid is stored in the measuring chamber by the volume upto the lower end of the opening of the liquid exit. Then, in the measuring cap of the present invention, since the measuring chamber is made of single wall and the cap main body is made of transparent material, a liquid of a volume less than the above-mentioned constant volume can be extracted under measurement by applying squeezing while observing, from the outside, the volume of the liquid flowing into the measuring chamber and the liquid of a desired volume can always be extracted. In addition, since the bottom wall of the measuring chamber is slanted, the liquid in a small volume is gathered to the circumference of the bottom wall thereby enabling easy observation even for a small volume of liquid making it possible to exactly extract a small volume.

Then, since the measuring cap of the present invention has a simple structure which facilitates the assembling of the cap and capping to the bottle, and furthermore the circumferential walls of the liquid measuring chamber do not overlap, some amount of material to be used is saved, thus capable of reducing cost.

Furthermore, since the measuring chamber can be completely sealed, the liquid remaining in the chamber after use does not coagulate, nor does the remaining liquid spill out of the chamber when the bottle falls down.

Then, to extract the liquid from the measuring chamber, the upper cap can be opened by one touch and the liquid can be extracted simply. In this case, since the pouring mouth is displaced from the center and situated near the circumferential wall of the measuring chamber, extraction is easy and can be conducted with less volume of liquid remaining after extraction. Further, upon assembling the measuring cap, the inner plug is set such that the direction aligning means formed on the circumferential wall of the measuring chamber and the engaging outer wall of the inner plug fit the liquid exit of the discharging pipe at an angle deviated from the direction of the pouring mouth, thereby enabling to prevent the inner liquid from splashing out of the pouring mouth even when the bottle is strongly squeezed.

Since the inner plug constituting the bottom wall of the measuring chamber is so adapted to engage from the bottom of the cap main body, it is not necessary to open the entire top of the cap main body and it has become possible to mold the pouring mouth smaller which makes the pouring out of the liquid easier.

BRIEF DESCRIPTION OF THE DRAWINGS

The drawings show one embodiment of a measuring cap according to the present invention, in which.

| Description of Numbered Elements | |
|---|---|
| 1. Measuring Cap | 15. Top Wall |
| 2. Squeezable Bottom | 16. Pouring Mouth |
| 3. Cap Main Body | 17. Tapered Wall |
| 4. Inner Plug | 18. Ringlike Protrusion |
| 5. Supply Pipe | 20. Annular Bung |
| 6. Bottle Neck Engaging Wall | 21. Discharging Pipe |
| 7. Circumferential Wall of Measuring Chamber | 22. Engaging Circumferential Wall |
| 8. Cap | 23. Bottom Wall of Measuring Chamber |
| 9. Measuring Chamber | 25. Discharging Aperture |
| 10. Screw Thread | 26. Recess |
| 12. Ratchet Fingers | 27. Supply Pipe Engaging Portion |
| 13. Direction Aligning Protrusion | 30. Bottle Neck |
| 14. Inner Plug Engaging Portion | 31. Ratchet |
| | 32. Screw Thread Stopper |

THE BEST PREFERRED MODE TO OPERATE THE PRESENT INVENTION

Figure 1:
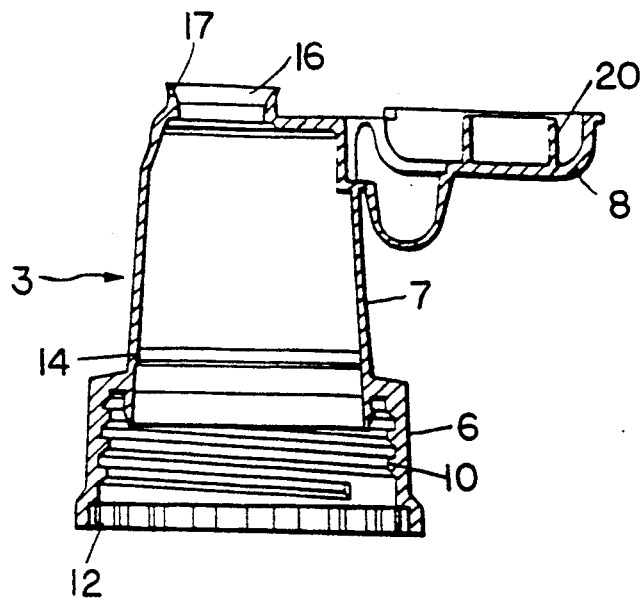
FIG. 1 is a front elevational cross sectional view of a cap main body.
Figure 2:
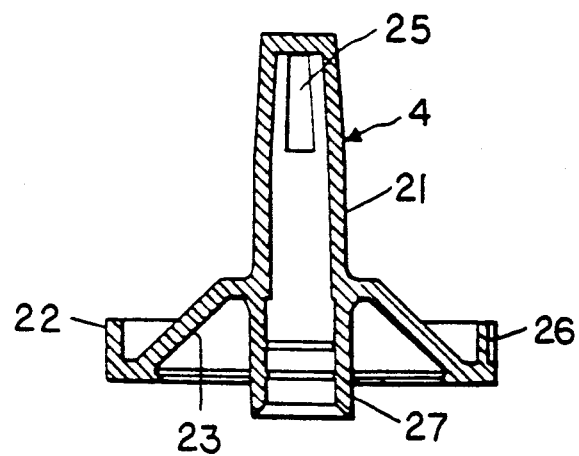
FIG. 2 is a front elevational cross sectional view of an inner plug.
Figure 3:
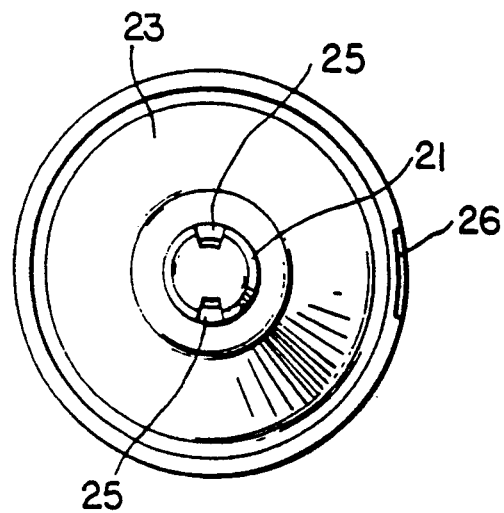
FIG. 3 is a plan view thereof.
Figure 4:
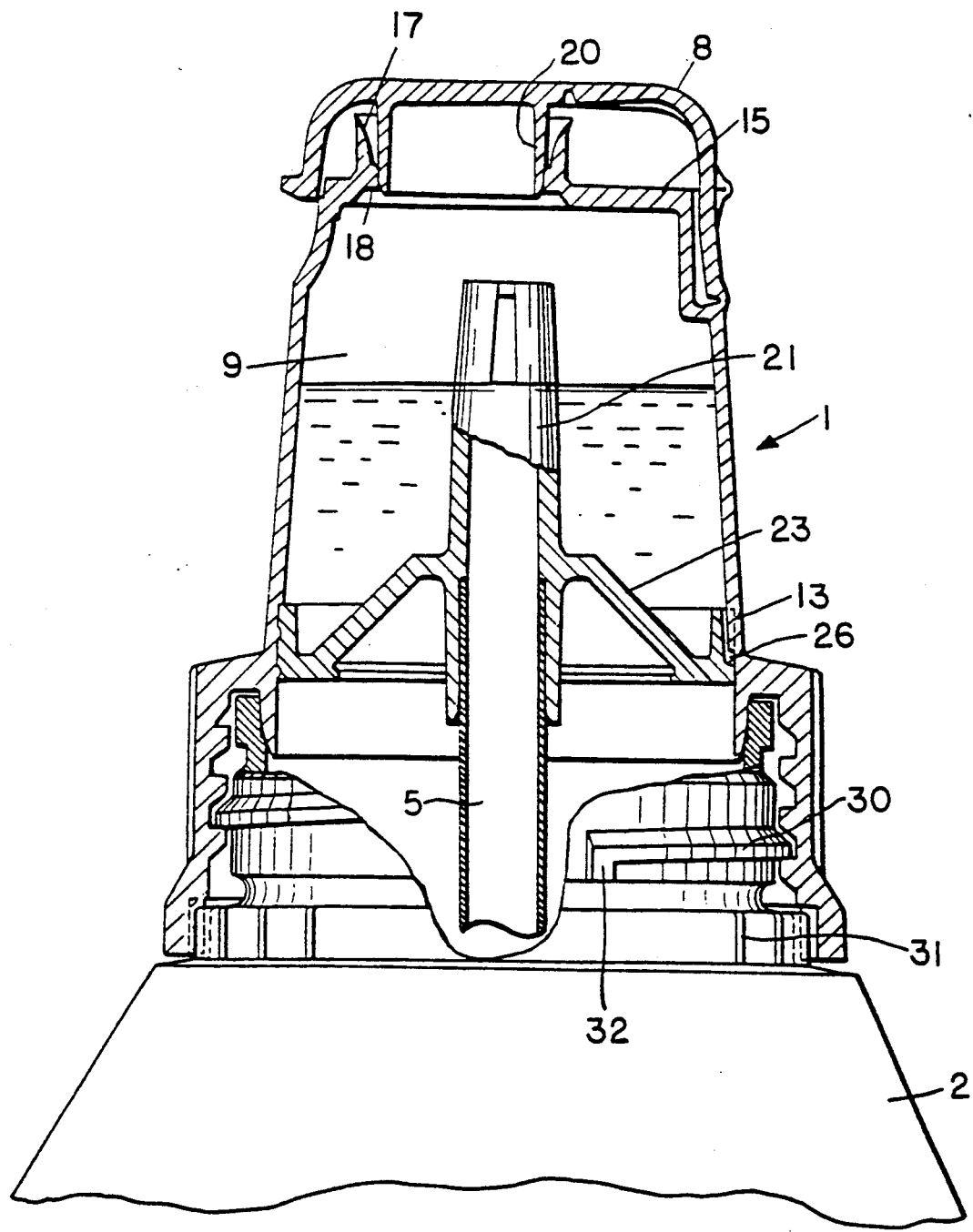
FIG. 4 is a front elevational cross sectional view in which the cap main body is engaged with a bottle.

The best mode of the invention is shown specifically in FIG. 1 to FIG. 4.

A measuring cap (1) according to the present invention comprises a cap main body (3), an inner plug (4) and supply pipe (5). The cap main body (3) is integrally constituted with a bottle neck engaging wall (6) formed with threads for screw-coupling with a bottle neck (30), a circumferential wall (7) for a measuring chamber constituting the circumferential wall of the measuring chamber, a top wall (15) for a measuring chamber formed with a pouring mouth (16), and a cap (8) connected by way of a spring hinge to the top of the measuring chamber and having a bung for closing a pouring mouth of the measuring chamber. A plurality of ratchet fingers (12) are formed below threads (10) on the bottle neck engaging wall (6) for meshing with a ratchet (31) formed to the bottle neck.

The circumferential wall (7) for the measuring chamber has a cylindrical shape having a top and slightly tapered above the bottle neck engaging portion and has a pressfitting portion (14) for the inner plug at the lower portion thereof. The inner plug engaging portion (14) is formed with a protrusion (13) as a direction aligning means for aligning the direction of the inner plug (4), so that it engages a positioning recess (26) of the inner plug to align the direction of the liquid discharging aperture of the inner plug. Further, a pouring mouth (16) is formed at the top wall (15) of the measuring chamber being displaced from the center for facilitating the discharge of liquid and reducing the volume of remaining liquid. Accordingly, the pouring mouth is made smaller to facilitate discharge as compared with the conventional case in which the top of the measuring chamber is entirely opened to constitute a pouring mouth. Further, as shown in the drawing, the pouring mouth (16) has an outwardly extended tapered wall (17) and a ring-like protrusion (18) is formed therebelow such that the bung of the cap is tightly engaged therewith. This makes the bung to engage more reliably to the pouring mouth and attain tight sealing, improve the liquid draining upon discharge and prevent dripping. The upper cap (8) is hinged at three points near the top of the measuring chamber (9) and an annular bung (20) is formed on the inner surface of the cap for engaging the pouring mouth.

The inner plug (4) has a discharging pipe (21) at the central portion and an engaging outer wall (22) at the outer circumference for engaging the circumferential wall of the measuring chamber, and the discharging pipe (21) and the engaging outer wall (22) are connected by means of a bottom wall (23) of the measuring chamber slanted outwardly and downwardly. The top of the discharging pipe (21) is closed and a groove of a predetermined length is cut vertically from the top to form a liquid discharging aperture (25). Further, a direction aligning recess (26) for aligning the direction of the inner plug is formed to the engaging outer wall (22), so that the liquid discharging aperture (25) is situated in the direction being deviated by 90° from the direction of the pouring mouth (16), and it engages the direction aligning protrusion (13) formed to the circumferential wall of the measuring chamber. The lower portion of the discharging pipe (21) is extended downwardly from the bottom wall (23) to constitute a supply pipe engaging portion (27) for engaging to hold the supply pipe (5).

The measuring cap in this embodiment has been constituted as described above and the measuring cap is assembled by engaging the supply pipe (5) of a length reaching the bottom of the bottle to the inner plug (4), engaging the inner plug (4) to the cap main body (3), so that the circumferential wall (7) of the measuring chamber of the cap main body and the measuring chamber bottom wall (23) of the inner plug constitute the measuring chamber. In this case, when the inner plug (4) is set such that the direction aligning protrusion (13) formed to the circumferential wall of the measuring chamber engages the direction aligning recess (26) formed to the engaging circumferential wall (22) of the inner plug, the liquid discharge aperture (25) of the discharging pipe is engaged at an angle deviated by 90° with respect to the pouring mouth (16) to prevent the inner liquid from splashing to the pouring mouth when the bottle (2) is strongly squeezed.

When the measuring cap (1) previously assembled in this way is screw-coupled with the neck (30) of the bottle (2) charged with the liquid till it engages a thread stopper (32) and turns no more, capping can be attained simply in a state where the pouring mouth 16 is always situated in a specific direction. Then, the ratchet fingers (12) of the measuring cap main body mesh with the ratchet (31) at the bottle neck in this state to each other to attain antislackening of threads, by which the cap main body is firmly fixed to the bottle neck.

Upon use, by squeezing the bottle (2), the inner liquid flows out through the supply pipe (5) into the measuring chamber (9). When the liquid in the measuring chamber reaches the height at the liquid discharging aperture (25) of the discharging pipe (21), since the volume of liquid exceeding this returns into the bottle when the bottle restores its original shape, the liquid is stored in the measuring chamber by a volume upto the lower end of the opening of the liquid discharging aperture to enable constant volume discharging. In addition, by applying squeezing while observing the volume of the liquid in the measuring chamber from the outside, the liquid in a volume less than the predetermined constant volume can be measured and discharged, so that a desired volume of liquid can always be discharged. Then, the liquid can be discharged from the measuring chamber in one touch by opening the hinge cap and tilting the bottle.

If graduations for measurement are disposed appropriately on the circumferential wall of the measuring chamber, more exact measuring and extraction are enabled.

Although the present invention has been illustrated with reference to a preferred embodiment as described above, the present invention is not limited to the above mentioned embodiment but various design modifications are possible. For instance, the upper cap for closing the pouring mouth of the cap main body may be disposed as a member separate from the cap main body. In a case where it is integrated, the hinge may be a hinge of a usual connection member instead of the spring hinge. Further, it is also possible to form a pouring mouth at the center of the cap and make the bottom wall of the measuring chamber horizontal. Further, the liquid discharging aperture of the discharging pipe can be formed by merely opening the top end. Furthermore, as the direction aligning means for engaging the inner plug to the cap main body, it is possible to form a recess at the upper end of the circumferential wall of the inner plug and a ridge or a protrusion may be formed to the circumferential wall of the measuring chamber for engaging said recess from above.

INDUSTRIAL APPLICABILITY

The present invention may be utilized preferably as caps for squeezable bottles which extract the inner fluid in small portions by attaching it onto restorable bottles such as plastic bottles filled with liquids such as liquid detergents and shampoos.

What is claimed is:

1. A measuring cap for use with a bottle, said bottle having a squeezable lower portion and an upper portion formed as a neck, said measuring cap comprising:

a generally cylindrical cap main body having an outer circumferential wall, said outer circumferential wall having a first end and a second end, said outer circumferential wall having a bottle neck engaging wall at said first end for directly engaging said bottle neck, a top wall formed with a pouring mouth offset toward one side of said top wall at said second end, and a pressfitting portion located between said first end and said second end, said pressfitting portion having a single direction aligning protrusion integrally formed therewith which extends radially inwardly from said outer circumferential wall;

an upper cap for closing said pouring mouth;

an inner plug sized to be insertable within said outer circumferential wall at said pressfitting portion, said inner plug having a discharging pipe integrally formed with a central portion of said inner plug and extending axially upward to a top portion within said outer circumferential wall, said discharging pipe having a supply pipe engaging portion formed at a lower portion thereof for engaging a supply pipe, said discharging pipe further including a liquid discharging aperture near said top portion, said inner plug further including an engaging outer wall for engaging said pressfitting portion of said outer circumferential wall, said engaging outer wall having a single direction aligning recess sized and disposed to engage said direction aligning protrusion to ensure that when said inner plug is inserted within said outer circumferential wall said liquid discharging aperture and said pouring mouth are out of angular alignment, said inner plug further having a bottom wall connecting said discharging pipe and said engaging outer wall; and a supply pipe engaged to said supply pipe engaging portion of said discharging pipe, whereby said bottom wall, said outer circumferential wall, and said top wall cooperate to define a tightly closed measuring chamber, and whereby said direction aligning protrusion and said direction aligning recess cooperate to secure said inner plug within said outer circumferential wall thus preventing relative rotation between said inner plug and said outer circumferential wall while maintaining said liquid discharging aperture out of angular alignment with said pouring mouth.

2. A measuring cap as defined in claim 1, wherein said upper cap has a bung for engaging said pouring mouth, said upper cap being integrally molded with said cap main body and connected to said cap main body by a hinge near said second end of said outer circumferential wall.

3. A measuring cap as defined in claim 2, wherein said hinge is a spring hinge.

4. A measuring cap as defined in any one of claims 1, 2, or 3, wherein said bottom wall is slanted outwardly and downwardly from said discharging pipe to said engaging outer wall.

5. A measuring cap as defined in any one of claims 1, 2, or 3, wherein said discharging pipe is closed at said top portion and said liquid discharging aperture constitutes at least one slit near said top portion.

* * * * *